United States Patent
Kim et al.

(10) Patent No.: US 9,577,948 B2
(45) Date of Patent: Feb. 21, 2017

(54) METHOD AND APPARATUS FOR CONNECTING TO SERVER USING TRUSTED IP ADDRESS OF DOMAIN

(75) Inventors: Byoung Hoon Kim, Seoul (KR); Seong Cheol Kim, Gyeonggi-do (KR)

(73) Assignee: AHNLAB, INC., Gyeonggi-Do (KR)

( * ) Notice: Subject to any disclaimer, the term of this patent is extended or adjusted under 35 U.S.C. 154(b) by 372 days.

(21) Appl. No.: 14/122,078

(22) PCT Filed: Jun. 1, 2012

(86) PCT No.: PCT/KR2012/004353
§ 371 (c)(1),
(2), (4) Date: Nov. 25, 2013

(87) PCT Pub. No.: WO2013/002495
PCT Pub. Date: Jan. 3, 2013

(65) Prior Publication Data
US 2014/0101314 A1    Apr. 10, 2014

(30) Foreign Application Priority Data

Jun. 27, 2011 (KR) .................. 10-2011-0062324

(51) Int. Cl.
*G06F 15/173* (2006.01)
*H04L 12/911* (2013.01)
*H04L 12/24* (2006.01)
*H04L 29/14* (2006.01)
*H04L 29/12* (2006.01)

(52) U.S. Cl.
CPC ............. *H04L 47/70* (2013.01); *H04L 41/082* (2013.01); *H04L 69/40* (2013.01); *H04L 61/1511* (2013.01)

(58) Field of Classification Search
CPC ....................................................... H04L 47/70
USPC ........................................................ 709/225
See application file for complete search history.

(56) References Cited

U.S. PATENT DOCUMENTS 7,487,546 B1 * 2/2009 Szor ...................... G06F 21/562
                                                        709/221
2009/0055929 A1   2/2009 Lee et al.

FOREIGN PATENT DOCUMENTS

| JP | 2008-54196 | 3/2008 |
|---|---|---|
| JP | 2008054196 | * 6/2008 |
| KR | 10-2001-0107137 | 12/2001 |
| KR | 10-2006-0093306 | 8/2006 |
| KR | 10-2008-0070793 | 7/2008 |
| KR | 10-2009-0096922 | 9/2009 |
| KR | 10-2009-0120343 | 11/2009 |

* cited by examiner

*Primary Examiner* — Glenford Madamba
(74) *Attorney, Agent, or Firm* — Bacon & Thomas, PLLC

(57) ABSTRACT

An apparatus for connecting to an update server includes an update unit configured to connect to the update server over a network using a pre-stored domain name address of the update server and an IP address acquisition unit configured to acquire an IP address of the connected update server. The IP address acquired by the IP address acquisition unit is stored as a trusted IP address in a storage unit. The apparatus further includes a reconnection processing unit configured to fetch the trusted IP address of the update server and try connecting to the update server using the trusted IP address in the case of failure to connect to the update server using the pre-stored domain name address.

4 Claims, 3 Drawing Sheets

METHOD AND APPARATUS FOR CONNECTING TO SERVER USING TRUSTED IP ADDRESS OF DOMAIN

TECHNICAL FIELD

The present invention relates to a technology for dealing with a disconnection to a server caused by an error on a domain name system (DNS) server or an attack such as hosts file modification, and more particularly, to an apparatus and method for connecting to an update server using a trusted IP address of a domain.

BACKGROUND ART

In general, in line with the recent rapid development and spread of the Internet, the value of information properties is increasing more and more, and various attempts have been made to protect the value of information properties. From a technical point of view, technologies for diagnosing or eliminating vulnerability to various threats such as hacking, viruses, worms, Trojans, phishing, pharming, or the like have been developing.

Phishing attacks refer to using spoofed emails and fraudulent websites designed to fool recipients into entering and transmitting personal information or financial information such as credit card number, account names and passwords, social security numbers, etc. Pharming attacks refer to a technique that fools a PC user into connecting to an internet protocol (IP) address designated by an attacker and divulging important information even when the user correctly enters a domain name address of website to be connected by exploiting hosts files referred to when performing a query from a PC to a domain name system (DNS) server and illegally modifying them.

In other words, a phishing attack is to put a link in emails that appear to be sent by websites of financial institutions, and steal personal authorization number, credit card number, account information or the like, while a pharming attack is a type of Internet fraud that occurs when a hijacker hijacks a legitimately owned website or fake domain name addresses to lure users to mistake fake sites as actual sites. The official domain of a website itself is hijacked in the middle of a transmission, and users believe without any suspicion that a fake site is the site they always use, and thus expose their personal ID, password, account information, and the like.

Moreover, the pharming attack increases the possibility of fooling a user more easily than the phishing attack because it directly or indirectly modifies the address of a DNS or proxy server. Methods for pharming attacks include modifying a DNS address, modifying a client hosts file, modifying an address established to a client's DNS server, modifying registered domain information, and using a proxy server.

In other words, the pharming attack infects a user terminal device with a malicious code or the like to change a hosts file in a user terminal device into that of a fake web server or information on a DNS server into that of a fake DNS server. Thereafter, if the user connects to a specific web server, the user uses the hosts file in the user terminal device or the fake DNS server in order to get the IP address of the web server. However, since the hosts file or DNS information has already been changed by infection with the malicious code, the user terminal device designates a web server with a fake IP address. As a result, the connection is made to the fake web server, and the user mistakes the fake site as a normal site and reveals his/her personal information.

In this way, pharming attacks are based on changing addresses to easily lure users to make connections without any suspicion, and generally take the form of 'modifying DNS information'. A DNS has the function of translating a frequently used domain name address, which is usually entered, into an IP address to connect to a site, or vise versa. The reason why this function is required is to use a domain name address to easily remember a desired site for visiting the site because it is not possible to remember all IP addresses enabling actual communication on a network.

But then, as mentioned above, while phishing attacks entice users to fake phishing sites by using similar domain name addresses, redirection via normal sites, and sophisticated fake pages or the like, the users themselves can recognize the phishing sites if they check them carefully. However, if DNS information is changed as is done in pharming attacks, this makes it more difficult for the users to recognize phishing sites and increases the possibility of luring the users to mistake these sites as actual sites, rather than fake sites. For this reason, large-scale damages due to pharming attacks can be expected to happen in some cases.

Further, although a technology for countering pharming attacks is employed, which requires user confirmation when setting a hosts file or DNS information or sets the hosts file or DNS information to be not changeable, it is difficult to determine whether any change in the hosts file or DNS information is a change due to a malicious code or a change made by the user. Thus, it is difficult to detect and counter pharming attacks in real situations.

Particularly, in case where information in the hosts file for update is modified due to a malicious code caused by a pharming attack, a new update cannot be performed and therefore information loss resulting from the pharming attack cannot be avoided.

DISCLOSURE OF INVENTION

Technical Problem

In view of the above, the present invention provides an apparatus and method for connecting to an update server using a trusted IP address of a domain, with an increased success rate of connection to the update server even in the event of hindering the connection due to a pharming attack hosts file.

The objects of the present invention are limited thereto, but other objects that are not described above will be apparently understood by those skilled in the art from the following description.

Solution to Problem

In one aspect, the present invention relates an apparatus for connecting to an update server on a network. The apparatus may include: an update unit configured to connect to the update server over the network using a pre-stored domain name address of the update server, wherein the update server provides a latest update file for performing update of an application program installed in the apparatus; an IP address acquisition unit configured to acquire an IP address of the connected update server and store the IP address along with the domain name address in a storage unit; and a reconnection processing unit configured to fetch a trusted IP address of the update server name and try connecting to the update server using the trusted IP address in the case of failure to connect to the update server using the pre-stored domain name address.

The reconnection processing unit may be configured to fetch the trusted IP address if a domain name server (DNS) query using the pre-stored domain name address fails or a hosts file is modified.

The apparatus may further includes an Internet Protocol (IP) address check unit designed to fetch the trusted IP address from the storage unit at preset time intervals and check whether or not the connection to the update server is successful using the trusted IP address.

In embodiment, the IP address acquisition unit may be configured to acquire the IP address through a domain name system (DNS) query of requesting an IP address of the update server.

In embodiment, the IP address acquisition unit acquires the IP address from information contained in the update file received from the update server.

In embodiment, the IP address acquired by the IP address acquisition unit may be stored as the trusted IP address in the storage unit.

In another aspect, the present invention relates to a method for connecting to an update server on a network. The method may include; connecting to the update server over the network using a pre-stored domain name address of the update server to update an application program with a latest update file; acquiring an IP address corresponding to the pre-stored domain name address of the update server; storing the IP address and the domain address of the update server in a storage unit; fetching a trusted IP address of the update server from the storage unit in the case of failure to connect to the update server using the pre-stored domain name address; and connecting to the update server using the trusted IP address to update the application program.

The method may further include: fetching the trusted IP address from the storage unit at preset time intervals; and checking whether or not the connection to the update server is successful using the trusted IP address.

In embodiment, the acquiring an IP address may include acquiring the IP address through a domain name server (DNS) query of requesting an IP address of the update server.

In embodiment, the acquiring an IP address may include acquiring the IP address from information contained in the update file.

In embodiment, the acquired IP address may be stored as the trusted IP address in the storage unit.

In embodiment, the trusted IP address is fetched if a domain name server (DNS) query using the pre-stored domain name address fails or a hosts file is modified.

Advantageous Effects of Invention

The embodiment makes a connection to an update server using a trusted IP address of the update server in the case of connection failure caused by domain name modification or hosts file modification and then update an application program such as a malicious code removal program by the latest update file received from the update server. Thus, harmful situations such as phishing, modification, pharming and the like can be actively avoided.

BRIEF DESCRIPTION OF DRAWINGS

The above and other objects and features of embodiments will become apparent from the following description of embodiments, given in conjunction with the accompanying drawings, in which.

BEST MODE FOR CARRYING OUT THE INVENTION

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Figure 1:
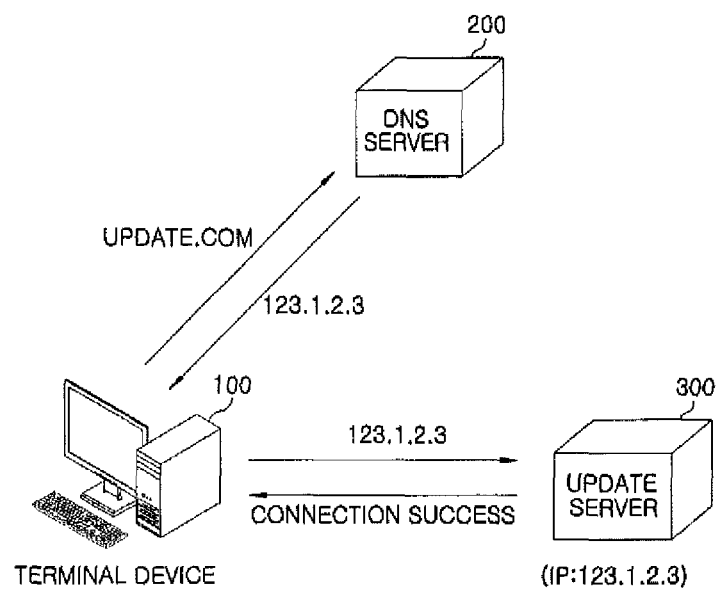
FIG. 1 schematically illustrates a computer network system of a type to which the embodiment of the present invention is applicable.

FIG. 1 schematically illustrates a computer network system of a type to which the embodiment of the present invention is applicable.

As shown, the computer network system includes a terminal device 100 for a client, a domain name system (DNS) server 200, and an update server 300. The terminal device 100, the DNS 200, and the update server 300 may be connected over a communication network, for example, a wired or wireless communication network.

In the embodiment, the terminal device 100 is referred to as an apparatus for connecting to the update server 300 via a communication network (not shown). The terminal device 100 installs an application program, e.g., a malicious code removal program therein and updates the malicious code removal program with a latest update file provided from the update server 300 which may be managed by vaccine developers or related security companies. The terminal device 100 may include, but not limited to, a personal computer (PC), a personal digital assistant (PDA), and a smart phone, or the like, which is operable to connect with the communication network.

When a user enters a domain name address, e.g., an "update.com" of the update server 300 desired to be connected, the terminal device 100 sends a DNS query of requesting an IP address of the update server 300 to the DNS server 200, receives the IP address, e.g., "123.1.2.3", from the DNS server 200 and connects to the update server 300 based on the IP address to get the latest update file. Accordingly, the terminal device 100 can update the malicious code removal program based on the latest update file. At this point, if the terminal device 100 was attacked and got infected with malicious codes or the like, a hosts file of the terminal device 100 may have been modified, and thus the terminal device 100 may unable to connect to a correct update server or connects to a fake website of the update server, thereby failing to perform the update by the latest update file.

Figure 2:
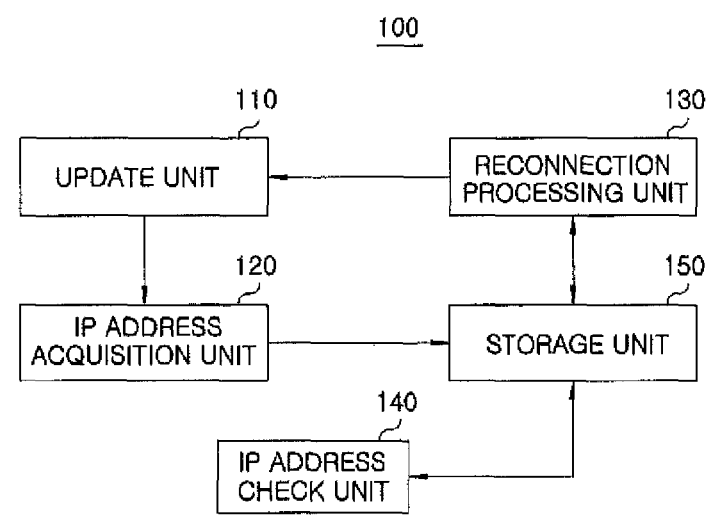
FIG. 2 is a detailed block diagram of a terminal device for connecting to an update server shown in FIG. 1.

But then, even though the terminal device 100 is infected with malicious codes or the like and hence is unable to connect to the correct update server 300 using the domain name address, the embodiment solves this problem and enables update of the application program such as the malicious code removal program by the latest update file. To this end, as shown in FIG. 2, the terminal device 100 includes an update unit 110, an IP address acquisition unit 120, a reconnection processing unit 130, an IP address check unit 140, and a storage unit 150.

The update unit 110 connects to the update server 300 using a pre-stored domain name address of the update server 300, and then performs update on the malicious code removal program using the latest update file provided from the update server 300. Upon completion of update in the update unit 110, the IP address acquisition unit 120 acquires an IP address corresponding to a domain name address of the update server 300. More specifically, the IP address acquisition unit 120 sends an IP address request to the domain server 200 by a DNS query using the domain name address, and acquires the IP address corresponding to the domain name address or acquires the IP address of the update server 300 from information contained in the latest update file provided from the update server 300. The acquired IP address is then stored in the storage unit 150 as a trusted IP address of a trusted domain.

If the update unit 110 fails to connect to the update server 300 using the pre-stored domain name address, the reconnection processing unit 130 fetches a trusted IP address matching the pre-stored domain name address from the storage unit 150 and tries connecting again to the update server 300 using the trusted IP address.

For example, failures to connect to the update server 300 may include a case where an incorrect IP address is provided from the DNS server 200 due to a fault of the DNS server 200, a case where the hosts file in the terminal device 100 is modified, and the like.

The IP address check unit 140 serves to fetch the trusted IP address of the update server 300 stored in the storage unit 150 at preset time intervals, and then check the validity for the trusted IP address by connecting to the update server 300 using the trusted IP address.

The storage unit 150 is for storing the trusted IP address associated with the domain name address, and may include, but not limited to, a hard disk, a memory, and so on.

In accordance with the embodiments, in the event of network connection failure due to domain information modification or hosts file modification, a connection to the update server 300 is made using the trusted IP address, and then the update is performed using the latest update file received from the update server 300, thereby increasing the success rate of connection to the update server against phishing, modification, pharming attacks, or the like.

Figure 3:
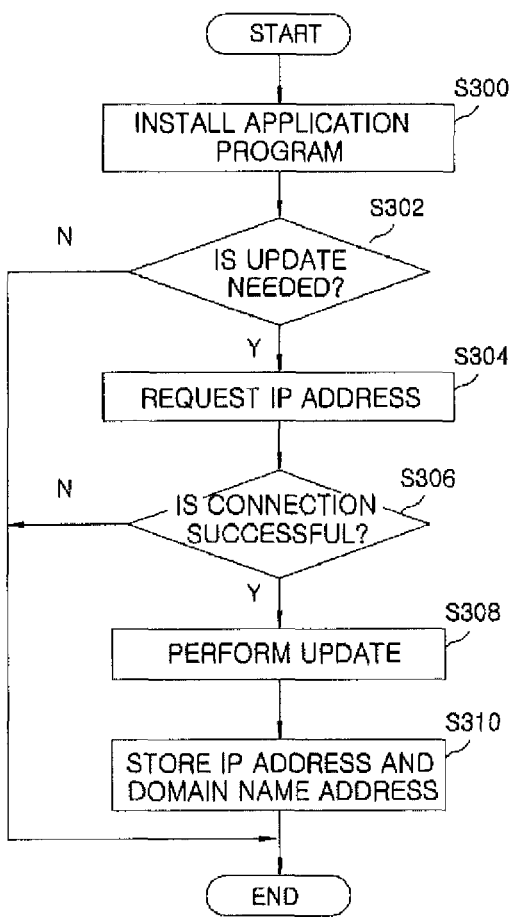
FIG. 3 is a flowchart illustrating a method for connecting an update server in accordance with an embodiment of the present invention.

FIG. 3 is a flowchart illustrating a method for connecting an update server in accordance with an embodiment of the present invention.

As shown in FIG. 3, when a malicious code removal program is installed in the terminal device 100 in step S300, the update unit 110 of the terminal device 100 determines whether or not update of the malicious code removal program is needed in step S302.

If it is determined, in step S302, that the update is needed, the update unit 110 send a DNS query of requesting an IP address corresponding to a pre-stored domain address for the update server 300 to the DNS server 200 and receives an IP address from the DNS server 200 in step S304. The update unit 110 then tries connecting to the update server 300 using the received IP address and determines whether or not the connection to the update server 300 succeeds or fails in step S306.

As a result of the determination in step S306, if the connection to the update server 300 is successful, the update unit 110 receives the latest update file from the update server 300 and then performs update of the malicious code removal program with the latest update file in step S308.

Upon completion of the update or during the update, the IP address acquisition unit 120 acquires an IP address corresponding to the domain name address of the update server 300, and then stores the acquired IP address as the trusted IP address along with the domain name address in the storage unit 150 in step S310. Here, ways for acquiring the IP address include obtaining the IP address received from the DNS server 200 and obtaining the IP address that is contained in the latest update file.

The acquired IP address may be stored when the malicious code removal program is installed in the terminal device 100 or each time when the malicious code removal program is updated.

Figure 4:
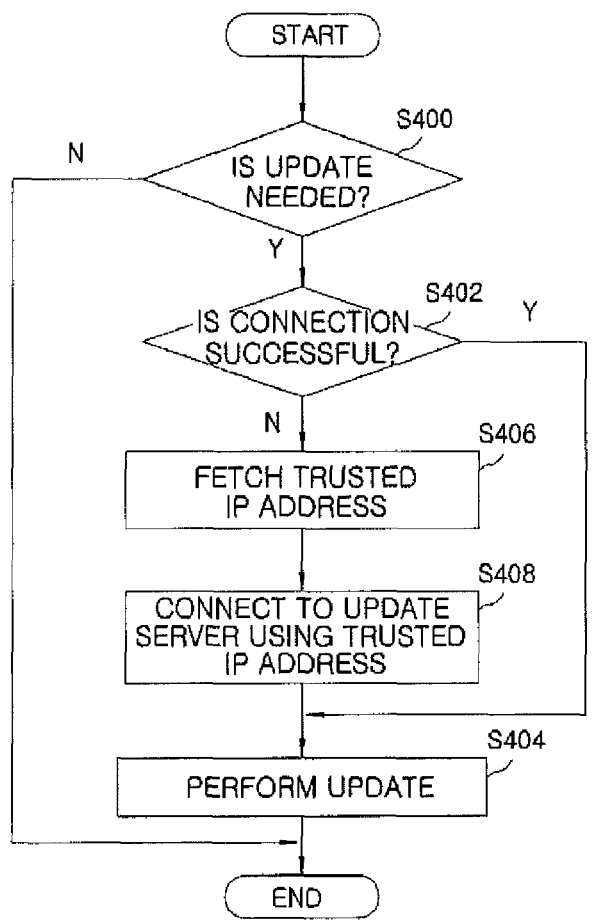
FIG. 4 is a flowchart illustrating an update process using a trusted IP address in accordance with an embodiment of the present invention.

FIG. 4 is a flowchart illustrating an update process using a trusted IP address in accordance with an embodiment of the present invention.

As shown in FIG. 4, the update unit 110 of the terminal device 100 determines whether or not update of the malicious code removal program is needed in step S400.

If it is determined, in step S400, that the update is needed, the update unit 110 attempts a connection to the update server 300 using the pre-stored domain name address and determines whether or not the connection is successful in step S402.

As a result of the connection attempt in step S402, if the connection is successful, the update unit 110 receives the latest update file from the update server 300 and performs update for the malicious code removal program in step S404.

If, however, it is determined that the connection fails in step S402, the reconnection processing unit 130 of the terminal device 100 fetches the trusted IP address of the update server 300 stored in the storage unit 150 in step S406, and then connects to the update server 300 again using the trusted IP address in step S408.

Thereafter, the reconnection processing unit 130 downloads the latest update file from the update server 300 and provides the latest update file with the update unit 110. The update unit 110 then updates the malicious code removal program using the latest update file in step S404.

In accordance with the embodiments, if a connection to the update server 300 using a domain name address cannot be made due to domain information modification, modification of the hosts file in the terminal device 100 or the like, a connection can be tried again to the update server 300 using the trusted IP address corresponding to the domain name address, thereby increasing the success rate of connection to the update server 300.

While embodiments have been shown and described, embodiments are not limited thereto. It will be understood by those skilled in the art that various changes and modifications may be made without departing from the scope of the embodiments as defined in the following claims.

The invention claimed is:

1. An apparatus for connecting to an update server on a network, comprising:
   a processor programmed with instructions that, when executed, cause the processor to:
   connect to the update server over the network using a pre-stored domain name of the update server, wherein the update server provides a latest update file for performing update of an application program installed in the apparatus;

acquire an IP address of the update server from information contained in the update file received from the update server and store the IP address along with the domain name in a storage device as a trusted IP address; and fetch the trusted IP address of the update server name and try connecting to the update server using the trusted IP address in the case of failure to connect to the update server using the pre-stored domain name, wherein the instructions further cause the processor to fetch the trusted IP address if a domain name server (DNS) query using the pre-stored domain name fails or a hosts file is modified, and wherein the instructions further cause the processor to fetch the trusted IP address from the storage device at preset time intervals, and check whether or not the connection to the update server is successful using the trusted IP address.

2. The apparatus of claim 1, wherein the instructions further cause the processor to acquire the IP address through a domain name system (DNS) query of requesting an IP address of the update server.

3. A method for connecting to an update server on a network, the method comprising:

connecting to the update server over the network using a pre-stored domain name of the update server to update an application program with a latest update file;

acquiring an IP address corresponding to the pre-stored domain name of the update server from information contained in the update file received from the update server;

storing the IP address and the domain address of the update server in a storage device as a trusted IP address;

fetching the trusted IP address of the update server from the storage device in the case of failure to connect to the update server using the pre-stored domain name; and connecting to the update server using the trusted IP address to update the application program, the method further comprising fetching the trusted IP address from the storage device at preset time intervals, and checking whether or not the connection to the update server is successful using the trusted IP address, wherein the trusted IP address is fetched if a domain name server (DNS) query using the pre-stored domain name fails or a hosts file is modified.

4. The method of claim 3, wherein the acquiring an IP address includes acquiring the IP address through a domain name server (DNS) query of requesting an IP address of the update server.

* * * * *